(12) United States Patent
Hackner et al.

(10) Patent No.: US 8,849,547 B2
(45) Date of Patent: Sep. 30, 2014

(54) METHOD FOR TESTING THE FUEL QUANTITY BALANCE IN A COMMON RAIL SYSTEM, CORRESPONDING ENGINE CONTROL SYSTEM, AND CORRESPONDING DIAGNOSTIC DEVICE

(75) Inventors: Michael Hackner, Winterbach (DE); Stefan Hoerenberg, Stuttgart (DE)

(73) Assignee: Robert Bosch GmbH, Stuttgart (DE)

( * ) Notice: Subject to any disclaimer, the term of this patent is extended or adjusted under 35 U.S.C. 154(b) by 381 days.

(21) Appl. No.: 13/420,399

(22) Filed: Mar. 14, 2012

(65) Prior Publication Data

US 2012/0239272 A1   Sep. 20, 2012

(30) Foreign Application Priority Data

Mar. 15, 2011   (DE) .......................... 10 2011 005 527

(51) Int. Cl.
| | |
|---|---|
| *F02D 41/22* | (2006.01) |
| *G01M 15/09* | (2006.01) |
| *F02M 59/36* | (2006.01) |
| *F02D 41/38* | (2006.01) |
| *F02M 63/02* | (2006.01) |

(52) U.S. Cl.
CPC .......... *F02D 41/3845* (2013.01); *F02M 59/366* (2013.01); *F02D 41/221* (2013.01); *F02D 41/3863* (2013.01); *G01M 15/09* (2013.01); *F02M 63/025* (2013.01)

USPC ........... 701/104; 701/107; 123/457; 123/479; 123/511; 73/114.38

(58) Field of Classification Search
USPC ......................... 123/456, 457, 479, 510, 511; 701/103–105, 107; 73/114.38, 114.43, 73/114.48
See application file for complete search history.

(56) References Cited

U.S. PATENT DOCUMENTS

2009/0288638 A1*  11/2009  Dintino et al. ................. 123/447
2012/0265424 A1*  10/2012  Dolker .......................... 701/104

FOREIGN PATENT DOCUMENTS

| DE | 10 2008 001 182 | 10/2009 |
|---|---|---|
| EP | 1 186 775 | 3/2002 |

* cited by examiner

*Primary Examiner* — Hai Huynh
(74) *Attorney, Agent, or Firm* — Kenyon & Kenyon LLP

(57) ABSTRACT

In a common rail system having two electrically controlled actuating elements, e.g., a metering unit at the input side of a high-pressure pump and a pressure regulating valve on the common rail, different fuel delivery quantities are able to be set in the common rail system while the vehicle is stationary, independent of the current engine load, by controlling operating points via one of the actuating elements and subsequently regulating the other actuating element. Control currents of the actuating elements correspond to the operating points. These control currents, or differences of control currents, are compared to target values to enable an evaluation of the common rail system.

10 Claims, 8 Drawing Sheets

METHOD FOR TESTING THE FUEL QUANTITY BALANCE IN A COMMON RAIL SYSTEM, CORRESPONDING ENGINE CONTROL SYSTEM, AND CORRESPONDING DIAGNOSTIC DEVICE

BACKGROUND OF THE INVENTION

1. Field of the Invention

The present invention relates to a method for testing the fuel quantity balance in a common rail system, a corresponding engine control system, and a corresponding diagnostic device, e.g., for motor vehicles, having two electrically controlled actuating elements, namely a metering unit at the input side of a high-pressure pump and a pressure regulating valve on the common rail.

2. Description of the Related Art

Defects in the low-pressure circuit, pump defects, or defects in other components of the high-pressure circuit of a common rail fuel supply system can cause a reduced fuel delivery rate. Such defects often first appear when delivery rates are present that are greater than the idling delivery rate. Causes of low delivery rate can include, among others, a clogged fuel filter, internal or external high-pressure leaks, piston wear (blow-by), or a defective, uptight intake or high-pressure valve of the high-pressure injection pump. Currently, for workshop diagnosis of the fuel supply system, there are available on the one hand invasive component-specific diagnostic tests that permit conclusions to be drawn, e.g. concerning the pump delivery rate, at specific test points on an external workshop test device, or that permit invasive non-component-specific tests of the low-pressure circuit (e.g. low-pressure measurement).

On the other hand, non-invasive diagnostic tests are used, for example a tightness test for the common rail system as proposed in published European patent application document EP 1 186 775 A2, or a test for uneven delivery as disclosed in published German patent application document DE 10 2008 001 182 A1.

In general, the diagnostic methods currently used in the workshop do not permit diagnostic conclusions to be reached without invasive intervention in the vehicle, in particular in the case of target delivery rates that are greater than the delivery rate of the pump during idling operation of the vehicle.

BRIEF SUMMARY OF THE INVENTION

The present invention enables a non-invasive diagnosis of insufficient fuel supply in a common rail system, for example in a motor vehicle. The diagnosis may be used both as a preventive measure and also in case of a defect.

In addition, working together with an error search carried out in a workshop, when there are delivery rate problems a defective high-pressure pump can be diagnosed in a manner pinpointing the component in the installed state, for test delivery rate quantities greater than the idling delivery rate.

As a further advantage, the present invention permits a rapid non-invasive diagnosis of the fuel supply system of a common rail system, and thus, if warranted, makes it possible to exclude, in the workshop, the common rail hydraulic system as a possible source of error. In addition, here it is possible to avoid disassembling a pump before a diagnosis at the component level can be made. This can result in a reduction of the number of unnecessarily dismantled pumps.

A non-invasive test, in the workshop, of the high-pressure pump at high delivery rates is enabled by the present invention. An inference pinpointing the defective pump is possible in connection with an error search that is carried out that uses exclusion tests for other components or subsystems.

All testing possibilities described in connection with specific embodiments of the present invention can be used for any common rail system of an internal combustion engine having two electrically controlled actuating elements, namely a metering unit at the input side of a high-pressure pump and a pressure regulating valve on the common rail for detecting insufficient supply of the common rail system, or reduced delivery rate of the high-pressure pump.

In addition, a preventive diagnosis can be realized that is particularly suitable for use with commercial/utility vehicles.

DETAILED DESCRIPTION OF THE INVENTION

Figure 1:
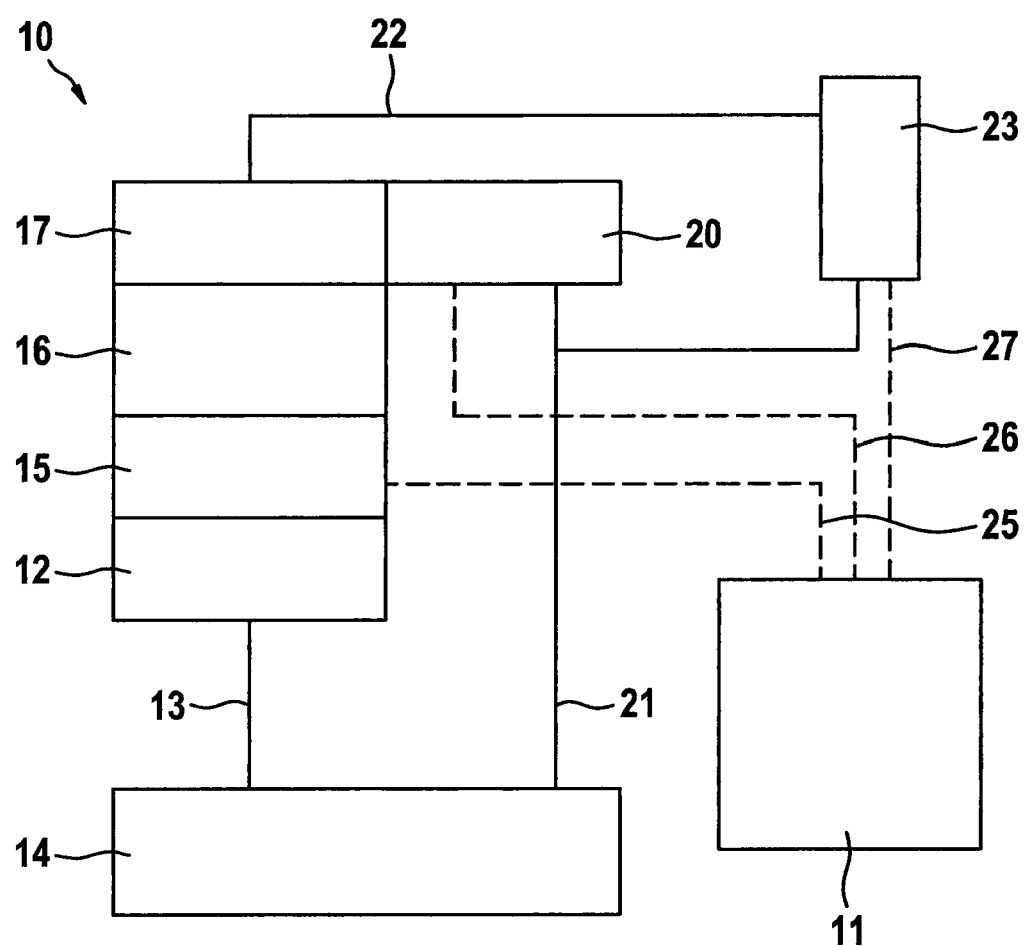
FIG. 1 shows a schematic representation of a common rail system having an engine control system according to a specific embodiment of the present invention.

FIG. 1 shows a schematic representation of a common rail system 10 having an engine control system 11 according to a specific embodiment of the present invention. Only the components important for understanding the present invention are shown.

A presupply pump 12 suctions fuel from a tank 14 via a supply line 13. Presupply pump 12 supplies fuel to a first regulable valve, here a metering unit 15. Metering unit 15 controls the quantity of fuel supplied to a high-pressure fuel pump 16. High-pressure fuel pump 16 conveys the fuel supplied to it under high pressure into common rail 17. In common rail 17, the rail pressure is controlled by a second regulable valve, here pressure regulating valve 20, which can admit fuel into a fuel return line 21 that leads to tank 14.

The fuel in common rail 17 is further supplied via high-pressure line 22 to injectors 23 that inject the fuel into cylinders (not shown) of an internal combustion engine. A quantity of fuel required for the operation of injectors 23 is also led back to tank 14 via fuel return line 21.

Engine control system 11 controls metering unit 15 via electrical control line 25, and controls pressure regulating valves 20 via electrical control line 26, and controls injectors 23 via electrical control line 27. In addition to software for controlling the engine during operation, engine control system 11 contains software for carrying out the method according to the present invention for testing the fuel quantity balance in the common rail system. The controlling of the engine takes place through electrical controlling of two electrically controlled actuating elements, namely metering unit 15 at the input side of high-pressure fuel pump 16 and pressure regulating valve 20 on common rail 17. The control current of at least one of these actuating elements is used in each of the various specific embodiments of the testing method. The measurement of the control current can take place directly at the actuating element or directly at or in the engine control system or indirectly in the engine control system using a control signal.

The method according to the present invention is now explained with reference to FIG. 1 on the basis of a plurality of specific embodiments and possible variants thereof.

The method according to the present invention for testing the fuel quantity balance in the common rail system of an internal combustion engine is described on the basis of six exemplary embodiments corresponding to six different testing possibilities. The common goal of all specific embodiments is a non-invasive detection of hydraulic problems in a common rail system given a target delivery quantity that is greater than the idling target delivery quantity of the high-pressure pump.

Inter alia, the present invention is based on the recognition that in a common rail system having two electrically controlled actuating elements, namely a metering unit at the input side of a high-pressure pump and a pressure regulating valve on the common rail, when the vehicle is stationary different fuel delivery quantities can be set in the common rail system independent of the current engine load. This takes place by controlling operating points via one of the actuating elements, and subsequent regulation of the other actuating element. Control currents of the actuating elements correspond to the operating points. According to the present invention, these control currents, or differences in control currents, are compared to target values, and enable an evaluation of the common rail system.

Each of the two actuating elements can be subsequently regulated, and the selection of the regulated actuating element can be changed during the test, and the current flowing to both actuating elements can be detected. Therefore, there are a large number of possible combinations that can be used to arrive at the evaluation according to the present invention of the common rail system. In the following, six specific embodiments are presented, possibly including alternative variants. The specific embodiments differ in the regulating mode that is selected and the way in which operating points are controlled. The variants differ in the evaluated currents or current differences.

All test possibilities described in the following have in common the method step of a conditioning of the engine state.

In the conditioning, a constant rail pressure and a constant engine rotational speed can be specified for each operating point. The engine rotational speed is higher than the standard idling rotational speed. As the temperature increases, the conveying efficiency of the common rail system is reduced, and for this reason the engine to be tested is to be operated in the hot state. In this way, the least favorable case can be examined in the workshop. It must be ensured that the engine can in fact attain a rotational speed specified in the test. Otherwise, the test cannot be carried out, and there is a fundamental defect in the common rail system.

In all test possibilities stated below, a constant engine rotational speed, and in addition a constant rail pressure, are set for each operating point. Here, the engine rotational speed is to be selected in such a way that a highest possible delivery rate of the high-pressure pump is achieved. In all the test possibilities, the increased fuel throughput in the common rail system is achieved by opening the pressure regulating valve or by opening the metering unit during the test.

Together with an error search carried out in a workshop, tests independent of the present invention can advantageously be carried out before and after the testing described here. Thus, the high-pressure system can be tested for leaks. In addition, the metering unit, the pressure regulating valve, or the high-pressure sensor can be tested. A testing of the low-pressure circuit in the sense of a supplementary test is recommended when it has been determined that there is insufficient supplying of the hydraulic system of the common rail system, in order to make it possible to distinguish whether a defect is present in the high-pressure circuit or in the low-pressure circuit.

First Example Embodiment of the Method

Figure 2:
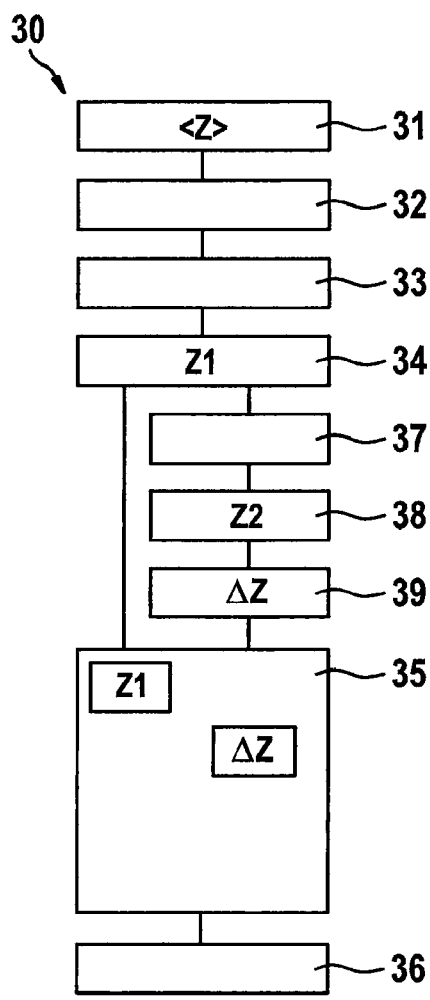
FIG. 2 shows a flow diagram of the method according to a first specific embodiment of the present invention, with metering unit regulating mode.
Figure 3:
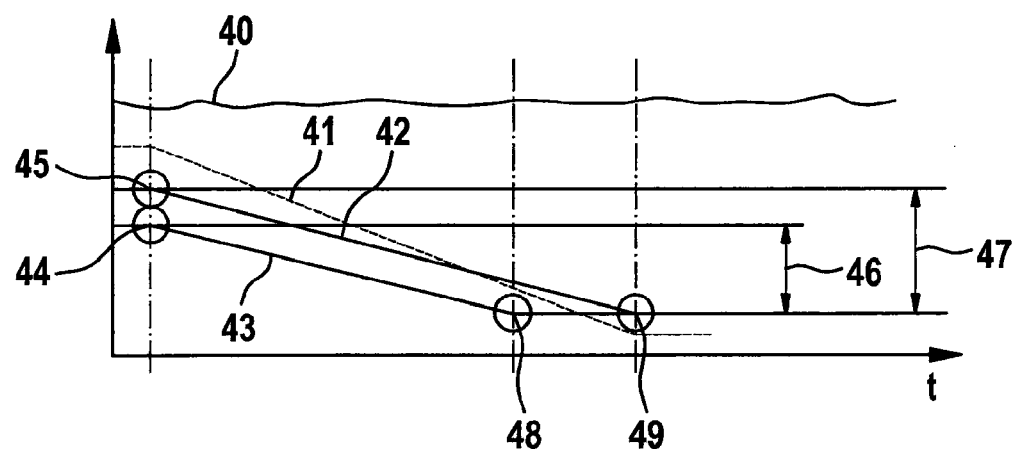
FIG. 3 shows a schematic diagram with characteristic quantities relating to the first specific embodiment of the present invention according to FIG. 2.

FIG. 2 shows a flow diagram 30 of the method according to a first example embodiment of the present invention, with metering unit regulating mode. The method focuses on the current of the metering unit. An alternative variant focuses on a difference in currents of the metering unit. FIG. 3 explains the system behavior in this embodiment.

The method for testing the fuel quantity balance in a common rail system of an internal combustion engine having two electrically controlled actuating elements, namely a metering unit 15 at the input side of a high-pressure pump 16 and a pressure regulating valve 20 on common rail 17, begins with method step 31: setting of a regulating mode by determining a controlled actuating element and a regulated actuating element. In this specific embodiment, metering unit 15 is regulated and pressure regulating valve 20 is controlled; metering unit regulating mode <Z>. Method step 32, conditioning of the engine, then follows; i.e. setting of a defined operating state of the engine in particular by specifying engine rotational speed and rail pressure. There follows method step 33: setting of a first system operating point by controlling the controlled actuating element. Pressure regulating valve 20 is first "almost" closed, and the fuel quantity at the system side is reduced to a point just before impairment of the quantity balance in idling operation. There follows method step 34: measuring of a current value Z1 of metering unit 15.

In the main variant of this specific embodiment, the set operating point is regarded as a stationary operating point, and the measured current value Z1 is evaluated. There then follows method step 35: determination of a comparison result using current value Z1 and an assigned prespecified value. Finally, there follows method step 36: evaluation of whether the fuel quantity balance shows an insufficient quantity, using the result of the comparison.

In an alternative variant of this specific embodiment, there takes place after method step 34, in method step 37, the setting of a second system operating point by controlling the controlled actuating element, here the step-by-step opening of pressure regulating valve 20, i.e. increasing the fuel quantity until metering unit 15 is completely open, i.e. the metering unit is at the edge of or outside the range of regulation. In method step 38, a second metering unit current value Z2 is measured, and in method step 39 a current value difference ΔZ is formed from current values Z1 and Z2 and is evaluated. As in the main variant of this specific embodiment, there now follows method step 35: determination of a comparison result, now using current value difference ΔZ and an assigned prespecified value. Finally, there follows method step 36: evaluation of whether the fuel quantity balance shows an insufficient quantity, using the comparison result.

If the regulated actuating element is situated at the edge of, or outside, the range of regulation, thus, in this example, when metering unit 15 is completely open, the regulated actuating element can no longer maintain the rail pressure, and the rail pressure deviates from a specified value. This deviation can be used as a trigger for the recognition that the regulated actuating element is situated at the edge of or outside the range of regulation.

For the explanation of the system behavior with regard to the first specific embodiment, FIG. 3 shows three superposed quantities with different scales over the same time axis, namely rail pressure curve 40 in the error-free case, current 41 flowing in pressure regulating valve 20 as manipulated quantity, and the current of the metering unit, both in the error-free case 42 and in the case of defective functioning 43. Through the controlled opening of pressure regulating valve 20, recognizable in current curve 41, the system follows by opening the metering unit in order to maintain the rail pressure.

The main variant uses the absolute value of the current of metering unit Z1, which in the case 44 of defective functioning is less than in the error-free case 45.

The alternative variant uses metering unit current difference ΔZ. In the case 46 of defective functioning, this will be smaller than in the error-free case 47, because the metering unit is already situated earlier outside its range of regulation, at 48 in the case of defective functioning and at 49 in the error-free case.

Second Example Embodiment of the Method

Figure 4:
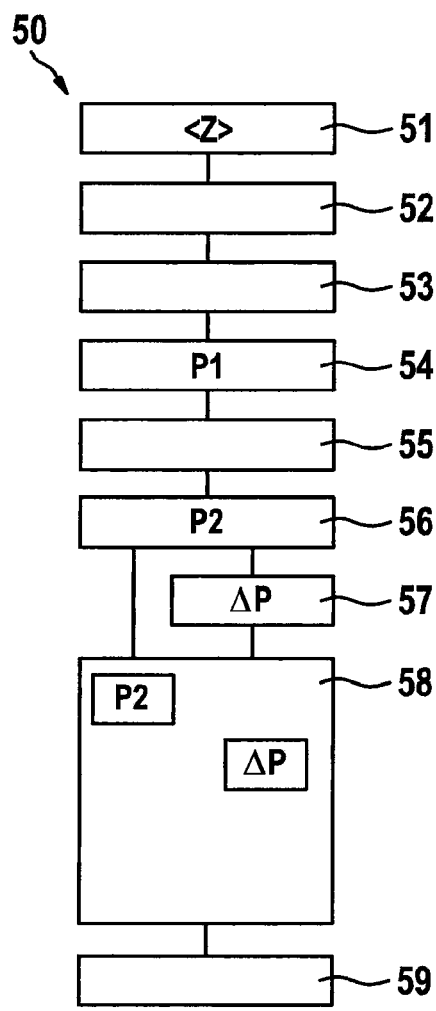
FIG. 4 shows a flow diagram of the method according to a second specific embodiment of the present invention, with metering unit regulating mode.
Figure 5:
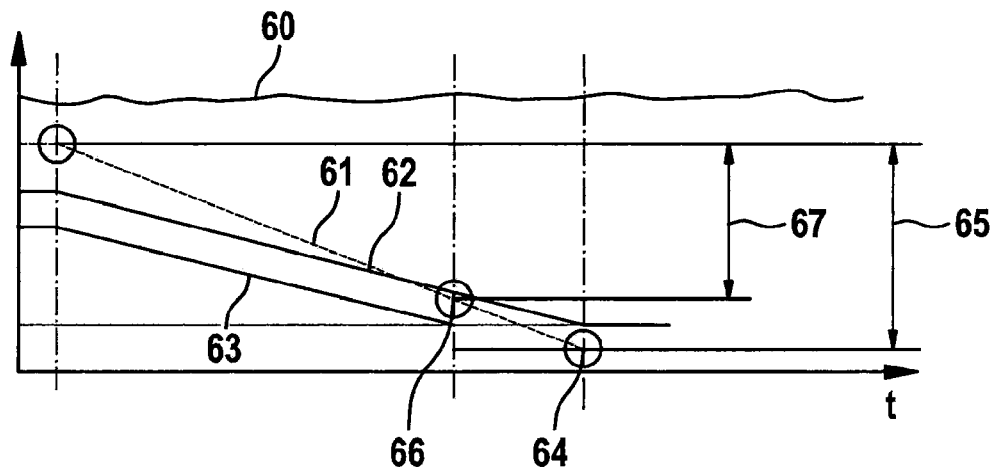
FIG. 5 shows a schematic diagram with characteristic quantities relating to the second specific embodiment of the present invention according to FIG. 4.

FIG. 4 shows a flow diagram 50 of the method according to a second example embodiment of the present invention, with metering unit regulating mode. The method focuses on the current of the pressure regulating valve. An alternative variant focuses on a difference in currents in the pressure regulating valve. FIG. 5 explains the system behavior in this embodiment.

The method for testing the fuel quantity balance begins with method step 51: setting of a regulating mode by determining a controlled actuating element and a regulated actuating element. In this specific embodiment, metering unit 15 is again regulated and pressure regulating valve 20 is controlled; metering unit regulating mode <Z>. There now follows method step 52: conditioning of the engine, i.e. setting of a defined operating state of the engine, in particular by specifying the engine rotational speed and the rail pressure. There follows method step 53: setting of a first system operating point by controlling the controlled actuating element. Pressure regulating valve 20 is first "almost" closed, and the fuel quantity at the system side is reduced to a point just before impairment of the quantity balance in idling operation. There follows method step 54: measuring of a current value P1 of pressure regulating valve 20.

In the two variants of this specific embodiment, there follows in method step 55 the setting of a second system operating point by controlling the controlled actuating element, here the step-by-step opening of pressure regulating valve 20, i.e. increasing the fuel quantity until metering unit 15 is completely open, i.e. the metering unit is situated at the edge of or outside the range of regulation. In method step 56, a second pressure regulating valve current value P2 is measured.

In the main variant of this specific embodiment, P2 is evaluated in method step 58: determination of a comparison result using second current value P2 and an assigned prespecified value. Finally, there follows method step 59: evaluation of whether the fuel quantity balance shows an insufficient quantity, using the comparison result.

In the alternative variant of this specific embodiment, in method step 57 a current value difference ΔP is formed from current values P1 and P2 and is evaluated. As in the main variant of this specific embodiment, there now follows method step 58: determination of a comparison result, now using current value difference ΔP and an assigned prespecified value. Finally, there follows method step 59: evaluation of whether the fuel quantity balance shows an insufficient quantity, using the comparison result.

For the explanation of the system behavior with regard to the second specific embodiment, FIG. 5 again shows three superposed quantities with different scales over the same time axis, namely rail pressure curve 60 in the error-free case, current 61 in pressure regulating valve 20 as manipulated quantity, and the current of the metering unit, both in the error-free case 62 and in the case of defective functioning 63. Through the controlled opening of pressure regulating valve 20, recognizable in current curve 61, the system follows by opening the metering unit in order to maintain the rail pressure.

In the error-free case, more fuel can be conducted away via the pressure regulating valve, which is reflected in a larger degree of opening of the pressure regulating valve at the end of the regulated path. In the error-free case, pressure regulating valve current P2 in 64 and pressure regulating valve current value difference ΔP in 65 differ from the case of a defective functioning in 66 or 67.

The main variant uses the absolute value of second current value P2 of the pressure regulating valve, which in the case 66 of defective functioning is greater than in the error-free case 64.

The alternative variant uses pressure regulating valve current difference ΔP. In the case 67 of defective functioning, this will be smaller than in the error-free case 65.

Third Example Embodiment of the Method

Figure 6:
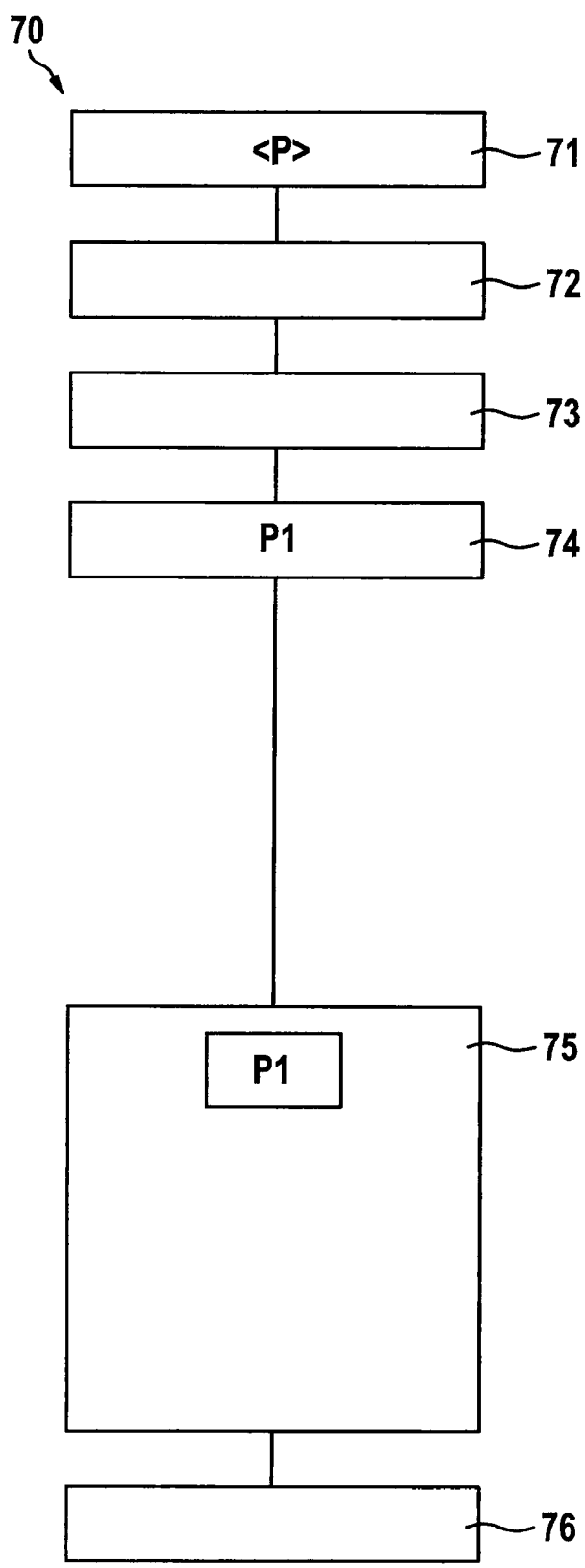
FIG. 6 shows a flow diagram of the method according to a third specific embodiment of the present invention, with pressure regulating valve regulating mode.

FIG. 6 shows a flow diagram 70 of the method according to a third example embodiment of the present invention, with pressure regulating valve regulating mode. The method focuses on the current of the pressure regulating valve. Only one measurement takes place, at a stationary measuring point.

The method for testing the fuel quantity balance begins with method step 71: setting of a regulating mode by determining a controlled actuating element and a regulated actuating element. In this specific embodiment, pressure regulating valve 20 is again regulated and metering unit 15 is controlled; pressure regulating valve regulating mode <P>. There now follows method step 72: conditioning of the engine, i.e. setting of a defined operating state of the engine, in particular by specifying the engine rotational speed and the rail pressure. There follows method step 73: setting of a first system operating point by controlling the controlled actuating element. A stationary operating point is set, and metering unit 15 is "almost" opened, and the metering unit has no throttle effect and does not cause a reduction of the delivery rate of high-pressure fuel pump 16. There now follows method step 74: measurement of a current value P1 of pressure regulating valve 20. Current value P1 is evaluated in method step 75: determination of a comparison result using current value P1 and an assigned prespecified value. There finally follows method step 76: evaluation of whether the fuel quantity balance shows an insufficient quantity, using the comparison result.

The system behavior is as follows: through a hydraulic undersupplying of the common rail system relative to a target state, the pressure regulating valve rail pressure regulating system reacts by shifting the pressure regulating valve operating point in order to regulate the rail pressure at a stationary operating point. A pressure regulating valve current value that is modified relative to a stored target value or original value can be used as a criterion for the evaluation. In the case of error-free functioning, the pressure regulating valve current is lower than in the case of defective functioning.

Fourth Example Embodiment of the Method

Figure 7:
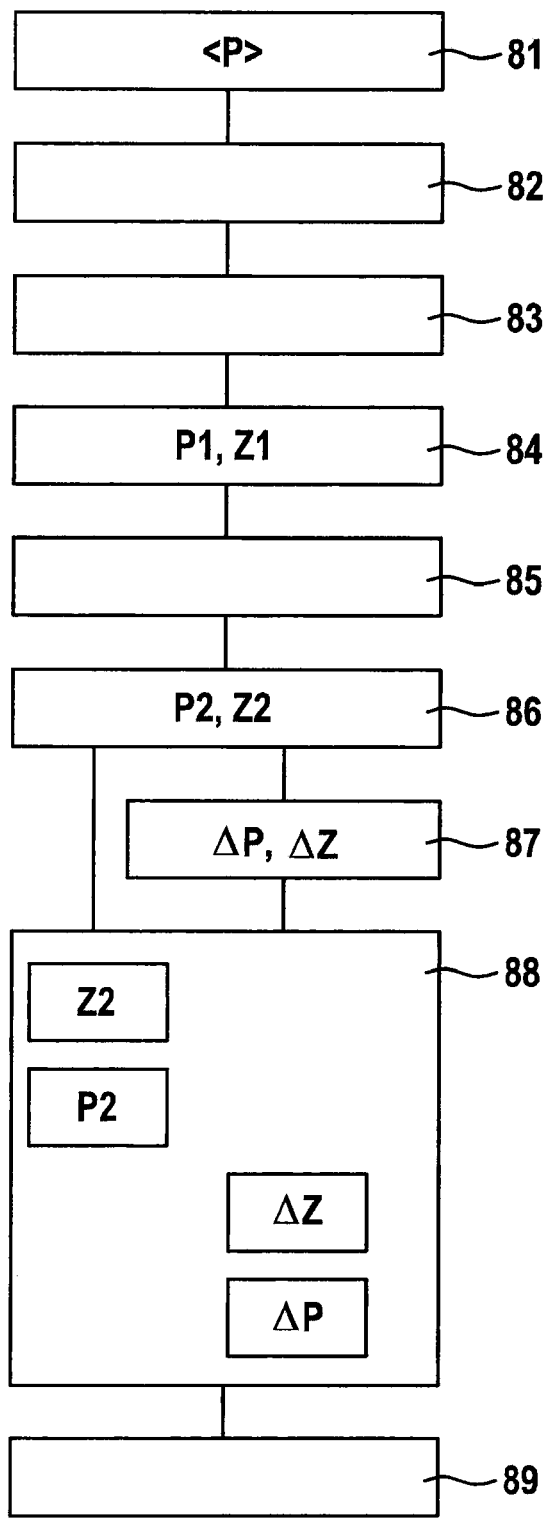
FIG. 7 shows a flow diagram of the method according to a fourth specific embodiment of the present invention with pressure regulating valve regulating mode.
Figure 8:
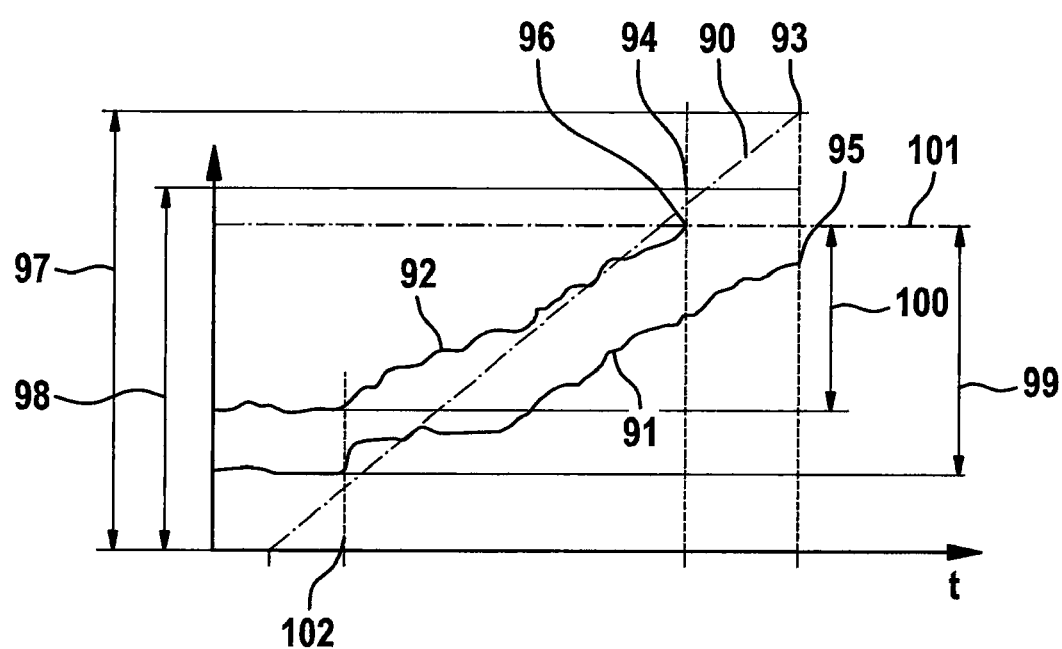
FIG. 8 shows a schematic diagram with characteristic quantities relating to the fourth specific embodiment of the present invention according to FIG. 7.

FIG. 7 shows a flow diagram 80 of the method according to a fourth example embodiment of the present invention, with pressure regulating valve regulating mode. The method first focuses on the current of metering unit 15. A first alternative variant focuses on the current of pressure regulating valve 20. A second alternative variant focuses on a difference in currents of the metering unit. A third alternative variant focuses on a difference in currents of the pressure regulating valve. FIG. 8 explains the system behavior in this embodiment.

The method for testing the fuel quantity balance begins with method step 81: setting of a regulating mode by determining a controlled actuating element and a regulated actuating element. In this specific embodiment, pressure regulating valve 20 is again regulated and metering unit 15 is controlled; pressure regulating valve regulating mode <P>. There now follows method step 82: conditioning of the engine, i.e. setting of a defined operating state of the engine, in particular by specifying the engine rotational speed and the rail pressure. There follows method step 83: setting of a first system operating point by controlling the controlled actuating element. An operating point is set, and metering unit 15 is "almost" opened, and the metering unit has no throttle effect and does not cause a reduction of the delivery rate of high-pressure fuel pump 16.

There now follows method step 84: measurement of a first current value. Here variants must be distinguished. In the main variant, and in the second alternative variant, current Z1 of metering unit 15 is measured; in the first alternative and third alternative variant, current P1 of pressure regulating valve 20 is measured.

In all variants of this specific embodiment, there follows in method step 85 the setting of a second system operating point by controlling the controlled actuating element, here step-by-step closing of metering unit 15, i.e. reduction of the fuel quantity in the common rail, until the pressure regulating valve is at the regulating limit, or until a specified metering unit current boundary value has been reached.

In method step 86, a second current value is measured at the same actuating element as in method step 84.

In the main variant of this specific embodiment, second current value Z2 of metering unit 15 is evaluated, and in the second alternative variant second current value P2 of pressure regulating valve 20 is evaluated, and the method continues in method step 88. In the first alternative variant and in the third alternative variant, current differences ΔZ or, respectively, ΔP is evaluated, and the difference formation in each case takes place correspondingly in these variants in method step 87.

In all variants of this specific embodiment, there now takes place, in method step 88, the determination of a comparison result, using, corresponding to the respective variant, second current value Z2 of metering unit 15, second current value P2 of pressure regulating valve 20, current value difference ΔZ, or current value difference ΔP. Finally, there follows method step 89: evaluation of whether the fuel quantity balance shows an insufficient quantity, using the comparison result.

For the explanation of the system behavior with regard to the fourth example embodiment, FIG. 8 shows two superposed quantities with different scales over the same time axis, current 90 of metering unit 15 as manipulated quantity, and the current of pressure regulating valve 20, both in the error-free case 91 and in the case of defective functioning 92.

Through the controlled closing of metering unit 15, i.e. reduction of the fuel quantity, the system will react by closing pressure regulating valve 20 in order to maintain the rail pressure. The system attempts to hold the rail pressure. As a consequence, the current supply to the pressure regulating valve is greater, causing pressure regulating valve 20 to close further. In this possible test, metering unit 15 is closed until pressure regulating valve 20 meets pressure regulating valve regulating limit 101, or until the specified metering unit current level is reached. When current is supplied to the metering unit, the throttling effect begins with a delay at time 102.

According to the main variant, the absolute value of the current supplied to the metering unit is used as a criterion for evaluating the hydraulic system. In the case of error-free functioning, the metering unit can be further closed at 93, i.e. a greater metering unit current level than in the case of defective operation at 94.

In the first alternative variant, the absolute value of the pressure regulating valve current is used. In the case of error-free functioning, regulating limit 101 is not reached at 95, but is reached at 96 in the case of defective operation.

In the third variant, a metering unit current difference is used to distinguish between the case of error-free functioning and that of defective functioning. In the case of error-free functioning, the metering unit can be closed further, or up to its specified current level, with a greater current value difference ΔZ in 97 than in the case of defective functioning in 98.

In addition, in the fourth variant a pressure regulating valve current difference is used to make a distinction. In the case of error-free functioning, pressure regulating valve regulating limit 101 is reached later than in the case of defective functioning, so that the two cases have a current value difference ΔP that can be used as a criterion for the evaluation, with a larger current value difference ΔP in the case of error-free functioning 99 than in the case of defective functioning 100.

Fifth Example Embodiment of the Method

Figure 9:
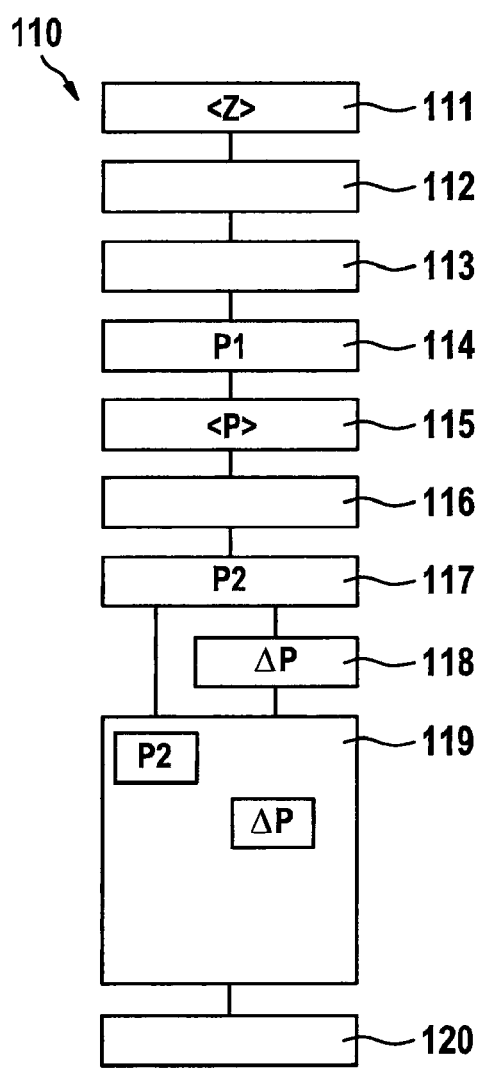
FIG. 9 shows a flow diagram of the method according to a fifth specific embodiment of the present invention, with metering unit regulating mode and changeover to pressure regulating valve regulating mode.
Figure 10:
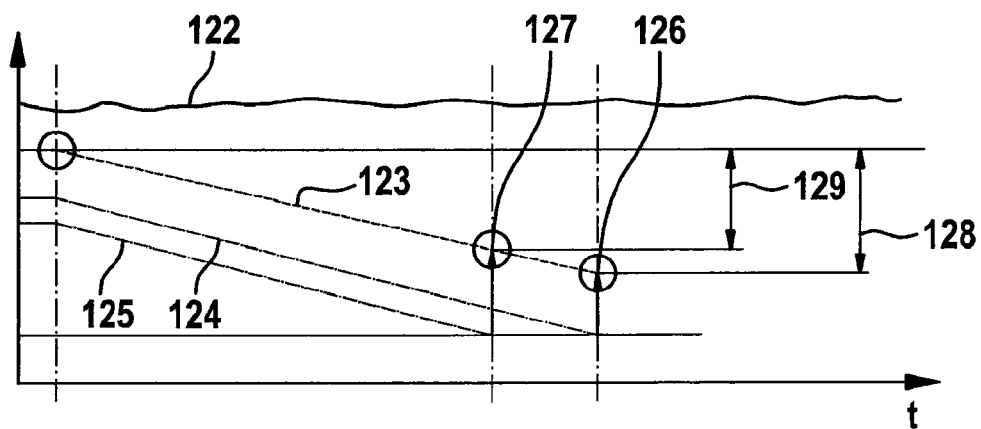
FIG. 10 shows a schematic diagram with characteristic quantities relating to the fifth specific embodiment of the present invention according to FIG. 9.

FIG. 9 shows a flow diagram 110 of the method according to a fifth example embodiment of the present invention, with metering unit regulating mode and changeover to pressure regulating valve regulating mode. The method is focused on the current of the pressure regulating valve. An alternative variant focuses on a difference of currents of the pressure regulating valve. FIG. 10 explains the system behavior in this embodiment.

The method for testing the fuel quantity balance begins with method step 111: setting of a regulating mode by determining a controlled actuating element and a regulated actuating element. In this specific embodiment, first metering unit 111 is regulated and pressure regulating valve 20 is controlled, metering unit regulating mode <Z>. There now follows method step 112: conditioning of the engine, i.e. setting a defined operating state of the engine, in particular by specifying engine rotational speed and rail pressure. There follows method step 113: setting of a first system operating point by controlling the controlled actuating element. Pressure regulating valve 20 is at first "almost" closed, and the fuel quantity at the system side is reduced to a point just before impairment of the quantity balance in idling operation. There now follows method step 114: measuring of a first current value P1 of pressure regulating valve 20.

In method step 115 the regulating mode is now changed over to pressure regulating valve regulating mode <P>.

In the two variants of this specific embodiment, there follows a method step 116 the setting of a second system operating point by step-by-step ramping up of the metering unit, i.e. lowering of the current level of the metering unit until a specified current boundary value is reached, i.e. increasing the fuel quantity.

In method step 117 a second pressure regulating valve current value P2 is measured.

In the main variant of this specific embodiment, P2 is evaluated in method step 119: determination of a comparison result using second current value P2 and an assigned prespecified value. Finally, there follows method step 120: evaluation of whether the fuel quantity balance shows an insufficient quantity, using the comparison result.

In the alternative variant of this specific embodiment, in method step 118 a current value difference ΔP is formed from current values P1 and P2 and is evaluated. As in the main variant of this specific embodiment, there now follows method step 119: determination of a comparison result, now using current value difference ΔP and an assigned prespecified value. Finally, there follows method step 120: evaluation of whether the fuel quantity balance shows an insufficient quantity, using the comparison result.

For the explanation of the system behavior with controlled metering unit opening in pressure regulating valve regulating mode, FIG. 10 shows, with regard to the fifth specific embodiment, three superposed quantities having different scales over the same time axis, namely rail pressure curve 122 in the error-free case, current 123 of pressure regulating valve 20 as manipulated quantity, and the current of the metering unit both in error-free case 124 and in the case of defective functioning 125. Through the controlled opening of metering unit 15, recognizable in current curves 124, 125, the system follows by opening pressure regulating valve 20 in order to maintain the rail pressure. In this test, the current is supplied to the metering unit up to a specified current threshold.

The main variant uses the absolute value of second current value P2 of the pressure regulating valve, which in the case 127 of defective functioning is greater than in error-free case 126.

The alternative variant uses pressure regulating valve current difference ΔP. In the case 129 of defective functioning, this will be smaller than in the error-free case 128.

Sixth Example Embodiment of the Method

Figure 11:
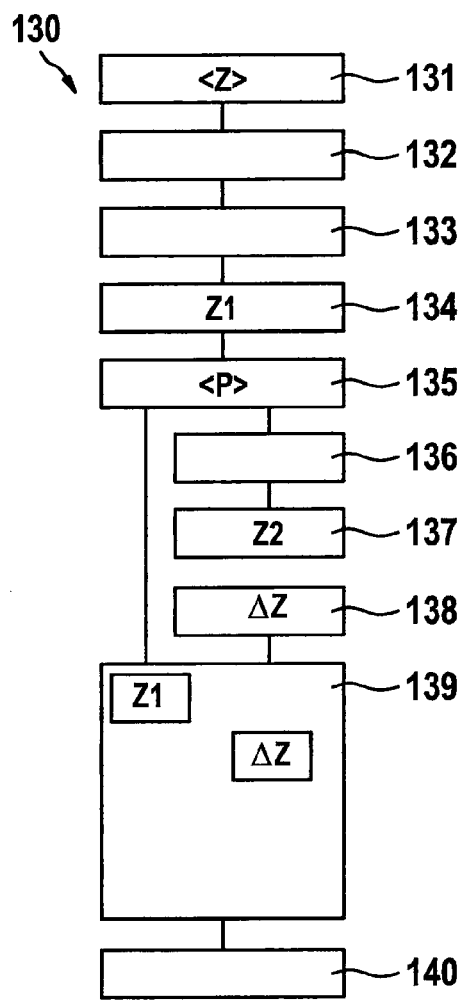
FIG. 11 shows a flow diagram of the method according to a sixth specific embodiment of the present invention, with metering unit regulating mode and changeover to pressure regulating valve regulating mode.
Figure 12:
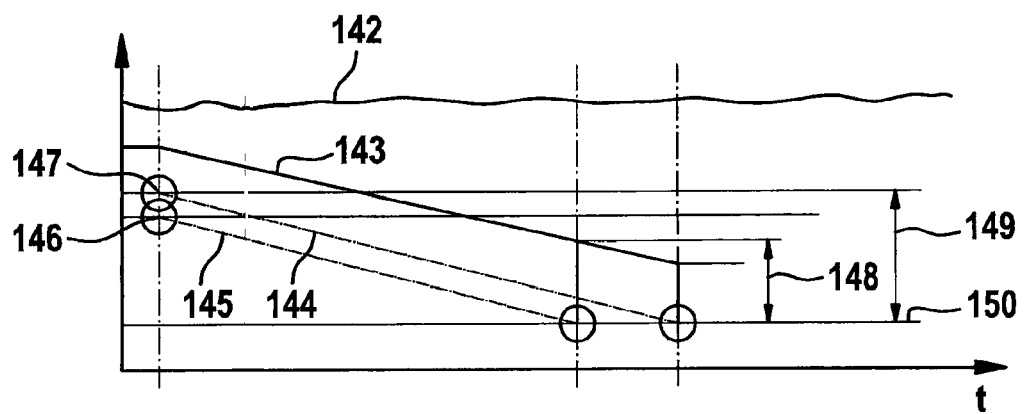
FIG. 12 shows a schematic diagram with characteristic quantities relating to the sixth specific embodiment of the present invention according to FIG. 11.

FIG. 11 shows a flow diagram of the method according to a sixth example embodiment of the present invention, with metering unit regulating mode and changeover to pressure regulating valve regulating mode. The method focuses on the current of the metering unit. An alternative variant focuses on a difference of currents of the metering unit. FIG. 12 explains the system behavior in this embodiment.

The method for testing the fuel quantity balance begins with method step 131: setting of a regulating mode by determining a controlled actuating element and a regulated actuating element. In this specific embodiment, first of all metering unit 15 is regulated and pressure regulating valve 20 is controlled, metering unit regulating mode <Z>. There now follows method step 132: conditioning of the engine, i.e. setting of a defined operating state of the engine in particular by specifying engine rotational speed and rail pressure. There follows method step 133: setting of a first system operating point by controlling the controlled actuating element. Pressure regulating valve 20 is at first "almost" closed, and the fuel quantity at the system side is reduced to a point just before impairment of the quantity balance in idling operation. There now follows method step 134: measuring of a first current value Z1 of metering unit 15.

In method step 135, the regulating mode is now switched over to pressure regulating valve regulating mode <P>.

In the main variant of this specific embodiment, the set operating point is regarded as a stationary operating point and the measured current value Z1 is evaluated. There now follows method step 139: determination of a comparison result using current value Z1 and an assigned prespecified value. Finally, there follows method step 140: evaluation of whether the fuel quantity balance shows an insufficient quantity, using the comparison result.

In an alternative variant of this specific embodiment, there takes place after method step 135, in method step 136, the setting of a second system operating point by step-by-step ramping up of the metering unit, i.e. lowering of the current level of the metering unit until a specified current boundary value has been reached, i.e. increasing the fuel quantity. In method step 137, a second metering unit current value Z2 is measured, and in method step 138 a current value difference ΔZ is formed from current values Z1 and Z2 and is evaluated. As in the main variant of this specific embodiment, there now follows method step 139: determination of a comparison result, now using current value difference ΔZ and an assigned prespecified value. Finally, there follows method step 140: evaluation of whether the fuel quantity balance shows an insufficient quantity, using the comparison result.

With regard to the sixth specific embodiment, for the explanation of the system behavior with controlled metering unit opening in pressure regulating valve regulating mode, FIG. 12 shows three superposed quantities with different scales over the same time axis, namely rail pressure curve 142 in the error-free case, current 143 of pressure regulating valve 20 as manipulated quantity, and the current of the metering unit, both in the error-free case 144 and in the case of defective functioning 145. Through the controlled opening of metering unit 15, recognizable in current curve 144, 145, the system follows by opening pressure regulating valve 20 in order to maintain the rail pressure. In this test, current is supplied to the metering unit up to a specified current threshold.

The main variant uses the absolute value of the current of metering unit Z1, which in the case 146 of defective functioning is smaller than in the error-free case 147.

The alternative variant uses the metering unit current difference ΔZ. In the case 148 of defective functioning, this will be smaller than in the error-free case 149, because the metering unit is already at the limit 150 of its range of regulation.

In addition, alternative specific embodiments of the method that are not shown are possible, in which the actuating elements are so to speak operated in a reverse direction of action. This means that a regulable valve is completely closed when there is no current, while it is however completely open at a system operating point.

The method according to the present invention is implemented by software that can be integrated into an engine control system for a common rail engine. Advantageously, this software is activated when the engine control system is connected to an external diagnostic device. However, the software can also be integrated into a diagnostic device for a common rail engine.

What is claimed is:

1. A method for testing a fuel quantity balance in a common rail system of an internal combustion engine having two electrically controllable actuating elements including a first controllable valve at the input side of a high-pressure fuel pump and a second controllable valve on the common rail, comprising:
   (a) setting a regulating mode by designating one of the two electrically controllable actuating elements as a controlled actuating element and designating the other electrically controllable actuating element as a regulated actuating element;
   (b) setting a defined operating state of the engine by specifying an engine rotational speed and a rail pressure;
   (c) setting a first system operating point by controlling the controlled actuating element;
   (d) measuring a first current value of one of the two electrically controllable actuating elements;
   (e) setting a second system operating point by controlling the controlled actuating element;
   (f) measuring a second current value of one of the two electrically controllable actuating elements;
   (g) forming a current value difference between the first and second current values;
   (h) performing a comparison between the current value difference and an assigned prespecified value; and
   (i) evaluating whether the fuel quantity balance shows an insufficient quantity, based on the result of the comparison.

2. The method as recited in claim 1, wherein in step e), the setting of the second system operating point takes place through step-by-step modification of the controlled actuating element until a specified condition occurs.

3. The method as recited in claim 2, wherein the specified condition occurs when the regulated actuating element is at the end of regulation range.

4. The method as recited in claim 2, wherein the specified condition occurs when the rail pressure deviates from a specified value.

5. The method as recited in claim 2, wherein the specified condition occurs when the current of the controlled actuating element has reached a specified current threshold.

6. The method as recited in claim 2, wherein the second controllable valve is the regulated actuating element.

7. The method as recited in claim 2, wherein the first controllable valve is the regulated actuating element.

8. The method as recited in claim 1, further comprising:
   j) changing the regulating mode set in step a), wherein the first controllable valve is designated as the regulated actuating element in step a), and wherein the second controllable valve is the regulated actuating element after changing the regulating mode.

9. A control system for testing a fuel quantity balance in a common rail system of an internal combustion engine having two electrically controllable actuating elements including a first controllable valve at the input side of a high-pressure fuel pump and a second controllable valve on the common rail, comprising:
   means for setting a regulating mode by designating one of the two electrically controllable actuating elements as a controlled actuating element and designating the other electrically controllable actuating element as a regulated actuating element;
   means for setting a defined operating state of the engine by specifying an engine rotational speed and a rail pressure;
   means for setting a first system operating point by controlling the controlled actuating element;
   means for measuring a first current value of one of the two electrically controllable actuating elements;
   means for setting a second system operating point by controlling the controlled actuating element;
   means for measuring a second current value of one of the two electrically controllable actuating elements;
   means for forming a current value difference between the first and second current values;
   means for performing a comparison between the current value difference and an assigned prespecified value; and
   means for evaluating whether the fuel quantity balance shows an insufficient quantity, based on the result of the comparison.

10. A non-transitory computer-readable data storage medium storing a computer program having program codes which, when executed on a computer, performs a method for testing a fuel quantity balance in a common rail system of an internal combustion engine having two electrically controllable actuating elements including a first controllable valve at the input side of a high-pressure fuel pump and a second controllable valve on the common rail, the method comprising:
   (a) setting a regulating mode by designating one of the two electrically controllable actuating elements as a controlled actuating element and designating the other electrically controllable actuating element as a regulated actuating element;
   (b) setting a defined operating state of the engine by specifying an engine rotational speed and a rail pressure;
   (c) setting a first system operating point by controlling the controlled actuating element;
   (d) measuring a first current value of one of the two electrically controllable actuating elements;
   (e) setting a second system operating point by controlling the controlled actuating element;
   (f) measuring a second current value of one of the two electrically controllable actuating elements;
   (g) forming a current value difference between the first and second current values;
   (h) performing a comparison between the current value difference and an assigned prespecified value; and
   (i) evaluating whether the fuel quantity balance shows an insufficient quantity, based on the result of the comparison.

* * * * *